D. Woodcock,
Making Staves.

N° 8,230.  Patented July 15, 1851.

UNITED STATES PATENT OFFICE.

D. WOODCOCK, OF INDEPENDENCE CENTER, NEW YORK.

MACHINE FOR SAWING AND DRESSING STAVES.

Specification of Letters Patent No. 8,230, dated July 15, 1851.

*To all whom it may concern:*

Be it known that I, DENNISON WOODCOCK, of Independence Center, in the county of Alleghany and State of New York, have invented certain new and useful Improvements in Machinery for Sawing and Cutting Staves, such as Used in Making Casks and other Similar Vessels; and I do hereby declare that the following is a full, clear, and exact description of the same, reference being had to the accompanying drawings, forming part of this specification, in which—

Figure 2:
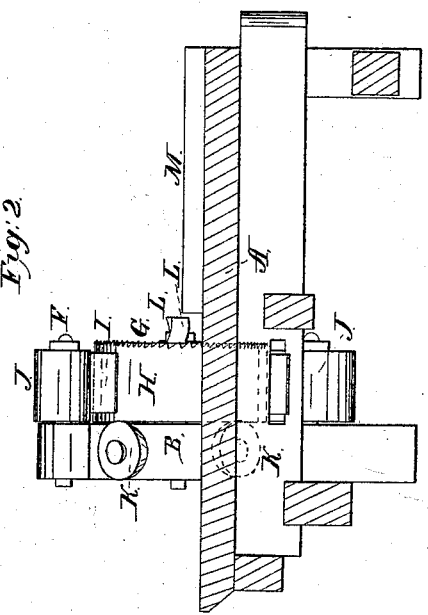
Figure 3:
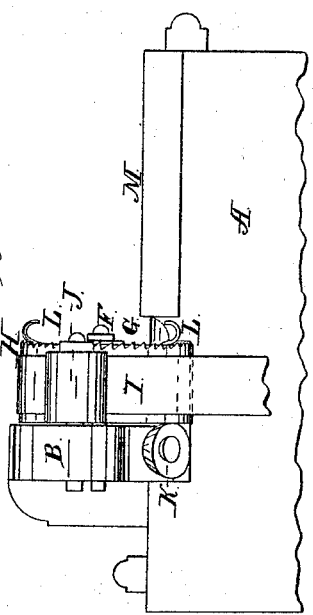
Figure 1:
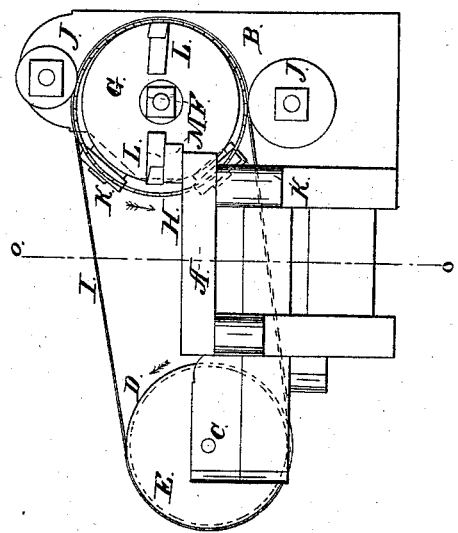

Figure 1, is an end elevation. Fig. 2, is a longitudinal section through the line O, O, Fig. 1, and Fig. 3, is a plan, having part broken away.

The same letters of reference denote similar parts throughout each of the several figures.

The nature of my invention consists in the employment of a cylindrical saw, having teeth around its one edge, and which is fitted loose on a pulley of somewhat smaller diameter, driven by friction of the saw, and provided with cutters projecting from its front face which serve to clean out and shape the inside of the stave that being fed up to the saw is cut of the required sweep or curve, the saw being driven by a band that holds it up to its place on the pulley the position of the saw with which is that of an eccentric so as to form a space of the thickness, and for the travel, as it is cut, of the stave.

To enable others skilled in the art to make and use my invention, I will proceed to describe its construction and operation.

A, is a feed table or bed, built on a suitable framing and with projections, also having attached to or in connection with it an upright standard B.

C, is the driving shaft; D, the driving pulley; and E, another pulley situated at the back for giving motion to the shaft C.

F, is the saw shaft fixed in the standard B, and G, a pulley fitting loosely on it, the center of the shaft F, being situated higher than the face of the bed or feed table.

H, is the cylindrical saw of any desired depth having teeth on its front edge, similar to the ordinary tub saw; it should be slightly elastic and of larger diameter than the pulley G, and is driven by a band I, from the pulley D.

J, J, are friction rollers turning on shafts secured to the standard B, they keep the band I, up to its bite on the saw, &c.

K, K, are rollers situated so as that the back edge of the saw works up against them.

L, L, are cutters, curved or of any suitable shape, secured to the face of the pulley G, from which they project so that their cutting points rather extend beyond the line of the periphery of the pulley, G.

M, is the feeding guide strip secured to the bed A. The bed A, may, if desired, be made adjustable so as to be set at any required height in relation to the saw, according to the width of stave required to be cut, and different sized saws on the same pulley G, may be used.

The operation is as follows: Motion is given to the pulley E, in the direction shown by black arrow Fig. 1, or the shaft C, made to rotate by any suitable power, which through the band I, will cause the saw H, to revolve in the direction shown by red arrow Fig. 1, and by its flexibility and adhesion or friction on the pulley G, produced by the tightening force of the band, which the rollers J, J, serve to increase; the pulley G, and cutters L, L, will be made to revolve together with the saw, the position of which with the pulley by their difference of diameter and tightening effect of the band, will be, as seen more particularly in Fig. 1, assuming the form of an eccentric, and leaving a space between it and the pulley of greater depth, (or placing them further apart) at a point a little below the center of and in front of the pulley G, being situated on or about a line drawn between the shafts C, F, which point of greatest depth will be constantly preserved in the same position by reason of the flexibility of the saw, and through the bite of the band and increased pressure caused by the rollers J, J. A board being fed up to the saw on the bed A, and having its edge bearing against the guide strip M, will have its inner edge operated on by the cutters L, L, (of which there may be any number) while the saw H, will simultaneously form the exterior surface of the stave until the whole stave of any required length is cut, and the board is again brought up for a fresh cut until consumed; the saw cutting the staves of a curve on their back answering to the required diameter of the cask or vessel, while the cutters L, L, give them an appropriate corresponding sweep answering to the inner diameter of the cask and serving to give them a cleaner interior surface than if operated on only by saw, the stave as it is being thus sawn and cut passing between the pulley G, and saw H, through the space described formed by the eccentric position of the saw with the pulley G, the saw being kept up to its cut or prevented from backing or slipping on its pulley by the rollers K, K, against which the back edge of the saw bears. The stave thus formed is ready for beveling or further finishing as required.

I do not claim the use of a cylindrical saw H, as such has frequently been used, but What I do claim as my invention and desire to secure by Letters Patent is—

The employment of the saw H, seated loose upon a pulley G, so as to form an eccentric position with the same as specified, in combination with the cutters L, L; the several parts constructed and operating together for the purposes set forth, substantially as shown and described.

DENNISON WOODCOCK.

Witnesses:
GEORGE H. BENNETT,
PHILO RICHARDSON.